US006196331B1

(12) United States Patent
Naito et al.

(10) Patent No.: US 6,196,331 B1
(45) Date of Patent: Mar. 6, 2001

(54) AIR SUPPLY AND EXHAUST SYSTEM FOR PNEUMATIC TOOL

(75) Inventors: Yasuhiro Naito; Hajime Takemura, both of Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 09/296,608

(22) Filed: Apr. 23, 1999

(30) Foreign Application Priority Data

Apr. 24, 1998 (JP) .......................... 10-115449
Sep. 16, 1998 (JP) .......................... 10-261368

(51) Int. Cl.[7] .......................... B23B 45/04; B27C 3/08
(52) U.S. Cl. .......................... 173/169; 173/168; 173/219; 173/DIG. 2; 181/230; 227/130
(58) Field of Search .......................... 173/169, DIG. 2, 173/218, 219, 168; 227/130; 181/230, 211

(56) References Cited

U.S. PATENT DOCUMENTS 2,780,966 * 2/1957 Frost et al. .......................... 173/218
2,964,120 * 12/1960 Graham .......................... 181/211
3,526,293 * 9/1970 Hayes et al. .......................... 173/DIG. 2
3,734,652 * 5/1973 Barnett .......................... 173/218
3,981,378 * 9/1976 Potter .......................... 173/DIG. 2
4,040,164 * 8/1977 Briles .......................... 227/130
4,184,564 * 1/1980 Trainor .......................... 181/230
5,909,016 * 6/1999 Sterling .......................... 173/DIG. 2

FOREIGN PATENT DOCUMENTS 50-27608 8/1975 (JP) .

* cited by examiner

*Primary Examiner*—Peter Vo
*Assistant Examiner*—Jim Calve
(74) *Attorney, Agent, or Firm*—Morgan, Lewis & Bockius LLP

(57) ABSTRACT

An air supply and exhaust system comprising a pneumatic tool, an air supply source, an exhaust apparatus, and at least one double-pipeline air hose. The exhaust apparatus includes a filter through which exhaust from the pneumatic tool passes and is provided apart from the pneumatic tool. The double-pipeline air hose includes two pipelines and connects the pneumatic tool and the air supply source, wherein one of the pipeline is for air supply to the pneumatic tool and the other of pipeline is for exhaust from the pneumatic tool.

20 Claims, 6 Drawing Sheets

AIR SUPPLY AND EXHAUST SYSTEM FOR PNEUMATIC TOOL

BACKGROUND OF THE INVENTION

1. Field of the Invention

This invention relates to an exhaust system especially for a tool driven by pneumatic pressure which causes exhaust discharged not from the tool but from the driving air supply source. More specifically, this invention relates to air supply and an exhaust system for pneumatic tools and particularly to an air supply and exhaust system which does not only reduce exhaust noise of a pneumatic tool but prevent the dust scattered by an exhaust air flow from scattering.

2. Description of the Related Art

Tools driven by pneumatic pressure, hereinafter simply called as pneumatic tools or tools, are normally arranged so that the compressed air used to drive the tools is discharged from exhaust ports into the atmosphere. However, the exhaust contains oil content and dust such as sealant dust discharged from the tool and it is undesirable that the oil content and dust are discharged into the atmosphere in view of the preservation of the environment. Moreover, because in these kind of tools, especially nailing machines, compressed air used to drive striking pistons is rapidly discharged from exhaust ports, expansion of compressed air, generation of whirling flow cause and the like cause noises. In addition, exhaust flows of compressed air blow around and diffuse dust and the like.

In view of the above, conventionally, filters are installed in the exhaust ports of the pneumatic tools so as to remove oil content, sealant dust and the like and to reduce noises by suppressing the rapid expansion of exhaust air.

However, such an arrangement for exhausting air through a filter as mentioned above may only result in decreasing output power of the tool if the flow rate of exhaust air is suppressed by the filter. Therefore, control of the flow rate of exhaust air needs to be eased, but sufficient noise reduction is not achieved.

Increasing the area of the opening of such a filter can be reasoned to cope with the problem mentioned above. This may achieve effect of the noise reduction without lowering the performance of the tool. However, the problem is that the shape and weight of the tool tend to increase, and this will result in reducing the workability.

In another conventional system for a pneumatic tool, the exhaust air is guided through an exhaust hose other than a supply hose so as to exhaust air from the tool. Then, the exhaust air is emitted into the atmosphere through an exhaust purifier having a built-in filter for soundproofing and dust-removing which is provided in the end portion of the exhaust hose.

However, in the conventional systems, two hoses have to be connected to the tool, so it results in spoiling the workability because the steering of the tool and the like become troublesome. Moreover, the laborious task of handling the tool ensues because it is necessitated to not only install the exhaust purifier separately but also move a compressed air supply source such as a compressor and the exhaust purifier when the work place is changed.

Tools such as nailing and staple driving machines driven by pneumatic pressure are constructed so that an exhaust port is provided in the head portion of a housing incorporating a pneumatic cylinder for driving a driver. The tools are also constructed so that a piston returns to a standby position by discharging pressurized air in the back of the piston from the exhaust port into the atmosphere after a nail or a staple is driven in. Therefore, the sound pressure felt by an operator is high because the pressurized air is discharged in the proximity of the operator holding the pneumatic tool. This results in accelerating operator's tired feeling to the extent that cannot be neglected. There are other problems arising from deteriorating working environment such as dust, sawdust and the like are blown up by the air flow jetted out of the exhaust port.

In order to solve the foregoing problems, there has been proposed an arrangement in which a pipe joint between a pneumatic tool and an air hose is built in the form of a coaxial double pipe comprising a center passage as an air supply passage and an outer passage as an exhaust passage surrounding the center passage (Japanese Utility Model Application Laid-open Sho. 50-27608).

In the case of the pipe joint mentioned above, pressurized air is supplied from an air compressor through the center passage of the pipe joint to the air chamber of the pneumatic tool, and exhaust is discharged through the outer passage after the air is used to drive an air cylinder. In other words, the air hose connected through the pipe joint to the pneumatic tool has of coaxial double tubular construction. That is, an outer hose is provided on the outer periphery of an air supply hose up to certain length from the pipe joint, and the end portion of the outer hose is left open as the outer hose ends in the middle of the coaxial air hose. Consequently, the exhaust air after driving the pneumatic cylinder is discharged into the atmosphere from the open end portion of the outer hose through the outer passage of the pipe joint and the outer hose of the coaxial air hose.

When the pipe joint and the coaxial air hose are employed, an exhaust port is placed away from an operator by the coaxial air hose with the effect of reducing the noise felt by the operator and preventing dust and the like from being blown up against the face of the operator. However, the absolute volume of the exhaust sound even in this case is not much different from one in the type in which the air is directly exhausted from the pneumatic tool since this case is less effective in terms of reducing the exhaust sound. On the contrary, when the coaxial air hose is moved around on the floor surface, the amount of dust and the like scattered may become greater than the amount of dust and the like directly exhausted from the pneumatic tool because the exhaust from the exhaust port in the end portion of the outer hose is in contact with the floor surface.

SUMMARY OF THE INVENTION

In order to solve the foregoing problems, as a first aspect of the invention, an object of the present invention is to provide an exhaust processing system for a pneumatic tool which can sufficiently reduces noises and prevents dust from blowing up without decreasing an output available from the pneumatic tool. As well as the above-mentioned object, it is also an object to provide an exhaust processing system for a pneumatic tool which is excellent in workability and handling convenience.

In addition, as a second aspect of the invention, an object of the present invention is to solve the foregoing technical problems by reducing the absolute volume of exhaust sound and the flow velocity of exhaust air flow to suppress noise and prevent dust and the like from scattering as much as possible.

The above object of the first aspect can be attained by an air supply and exhaust system comprising a pneumatic tool, an air supply source, an exhaust apparatus, and at least one double-pipeline air hose. The exhaust apparatus includes a filter through which exhaust from the pneumatic tool passes and is provided apart from the pneumatic tool. The double-pipeline air hose includes two pipelines and connects the pneumatic tool and the air supply source, wherein one of the pipeline is for air supply to the pneumatic tool and the other of pipeline is for exhaust from the pneumatic tool.

Preferably, the exhaust apparatus is fitted on the air supply source.

It is more preferable that the air supply and exhaust system further comprises an auxiliary tank fitted between the a pneumatic tool and an air supply source. More preferably, the exhaust apparatus is fitted on the auxiliary tank.

The above object of the second aspect can be attained by an air supply and exhaust system comprising a pneumatic tool, an air supply source, a silencer, and at least one double-pipeline air hose. The silencer includes a sound-absorbent chamber. The double-pipeline air hose includes two pipelines and connects two of the pneumatic tool, the air supply source, and the silencer, wherein one of the pipeline is for air supply to the pneumatic tool and the other of pipeline is for exhaust from the pneumatic tool.

It is preferable that the sound-absorbent chamber includes a sound-absorbent material, and the sound-absorbent material is made of felt.

More preferably, the air supply and exhaust system further comprises at least one coaxial pipe joint which includes two pipelines and connects the double-pipeline air hose and one of the pneumatic tool, the air supply source, and the silencer.

It is more preferable that the air supply and exhaust system further comprises at least one single pipe joint which includes one pipeline and connects the double-pipeline air hose and one of the air supply source and the silencer.

It is also preferable that the air supply and exhaust system further comprises a single-pipeline air hose which includes one pipeline and connect the air supply source and the silencer, wherein the double-pipeline air hose connect the pneumatic tool and the silencer.

More preferably, the air supply and exhaust system further comprises a baffle plate against which exhaust flow hits in an exhaust passage from the pneumatic tool to the sound-absorbent chamber.

DETAILED DESCRIPTION OF THE PREFERRED EMBODIMENTS

Figure 1:
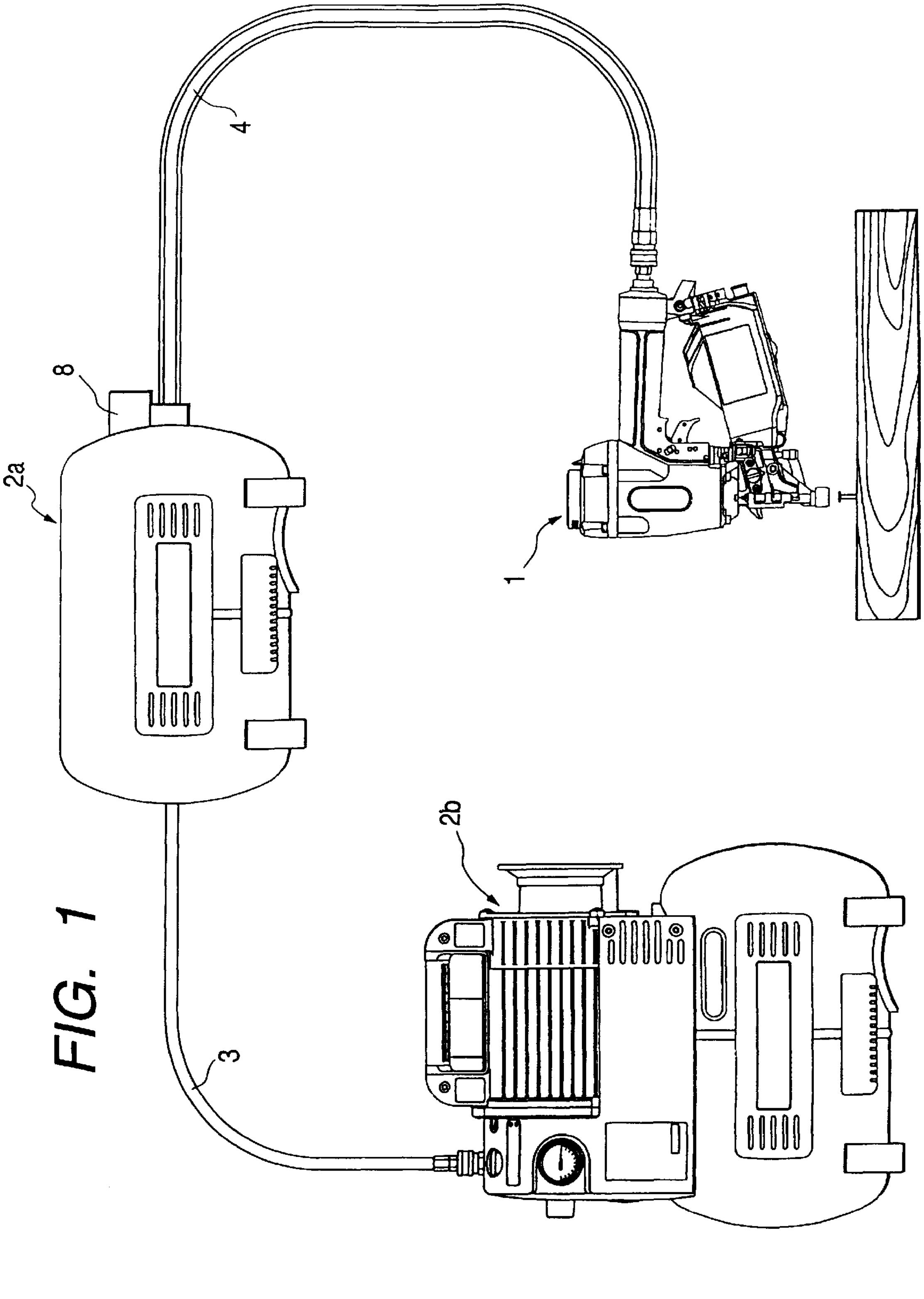
FIG. 1 is an overall diagram of an exhaust system for a tool driven by pneumatic pressure according to a first embodiment of the present invention.
Figure 2:
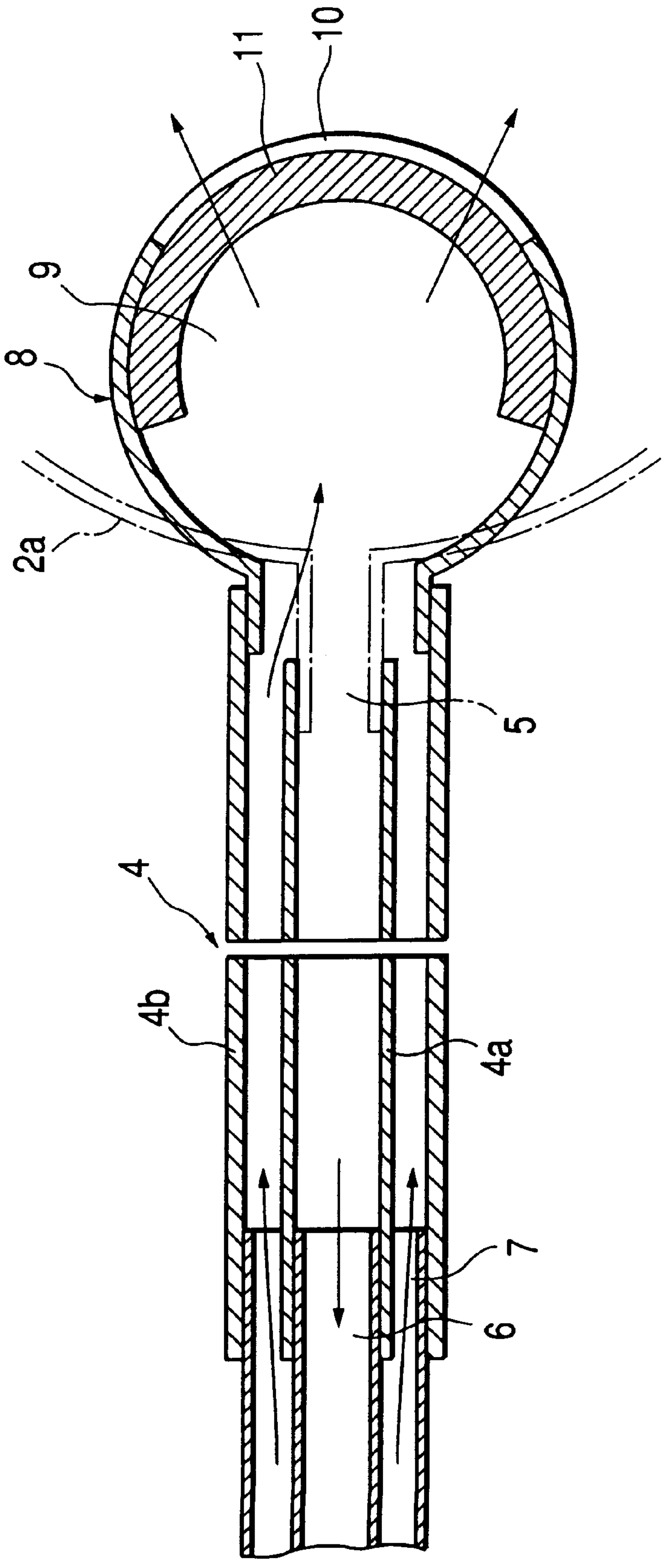
FIG. 2 is a diagram briefly explaining the principal part of the exhaust system.

FIGS. 1 to 2 show a first embodiment of the present invention. In FIG. 1, reference numeral 1, 2*a* and 2*b* respectively denote a pneumatic tool (a nailing machine in FIG. 1), an auxiliary tank and an air compressor. Driving air from the air compressor 2*b* is stored in the auxiliary tank 2*a* through an air hose 3 before being supplied to a pneumatic tool 1 through an air hose 4. The driving air for the pneumatic tool 1 is directly supplied from the auxiliary tank 2*a* and when air pressure in the auxiliary tank 2*a* lowers, the air pressure in the auxiliary tank 2*a* is boosted by the air compressor 2*b*. Therefore, the auxiliary tank 2*a* and the air compressor 2*b* are air supply sources.

A supply port 6 for supplying the driving air and a discharge port 7 for discharging the air are arranged at the end of the grip of the tool 1 in a way adjacent to each other.

The pneumatic tool 1 and the auxiliary tank 2*a* are coupled by a double hose 4. As shown in FIG. 2, the double hose 4 is so structured as to incorporate an outer pipeline 4*b* placed in the outer peripheral portion of an inner pipeline 4*a* disposed in the central portion of the hose 4, the outer and inner pipelines 4*b* and 4*a* being coaxial. Both ends of the inner pipeline 4*a* are each connected to the discharge port 5 of the auxiliary tank 2*a* and to the supply port 6 of the pneumatic tool 1, whereas both ends of the outer pipeline 4*b* are each connected to the discharge port 7 of the pneumatic tool 1 and to an exhaust system 8 provided in the auxiliary tank 2*a*. Consequently, the driving air from the auxiliary tank 2*a* is passed through the inner pipeline 4*a* before being supplied to the pneumatic tool 1. The exhaust air that has been used to drive the pneumatic tool 1 is passed through the outer pipeline 4*b* and guided opposite to the direction of supplying the air to the inner pipeline 4*a* before being discharged through the exhaust unit 8 of the auxiliary tank 2*a*.

An exhaust chamber 9 is formed in the exhaust system 8, and an exhaust opening 10 having a large area is formed in the exhaust chamber 9. Inside the exhaust opening 10, a filter 11 being installed.

In the structure mentioned above, the tool 1 is driven by the driving air supplied from the auxiliary tank 2*a* through the inner pipeline 4*a* of the air hose so as to do nailing work first. Then the driving air is expanded while it is being passed through the exhaust system 8 of the auxiliary tank 2*a* after being passed through the outer pipeline 4*b* of the double hose 4 from the head portion of the tool 1. When the expanded air is discharged from the exhaust opening 10, the flow velocity of the exhaust air is suppressed by the filter 11 and dust in the exhaust air is removed; therefore, the driving air is purified before being discharged.

As set forth above, the pneumatic tool 1 is operated like an ordinary conventional pneumatic tool to supply the driving air by means of one single air hose for guiding the exhaust air up to the exhaust system 8 provided in the auxiliary tank 2*a*. Hence, the workability will not be spoiled as the pneumatic tool 1 can freely be steered.

Since the filter 11 for use in emitting the air into the atmosphere is provided for the exhaust system 8 incorporated into the auxiliary tank 2*a* of a compressed air supply source, it is only needed to move the auxiliary tank 2*a* when the work place is changed without necessitating moving the exhaust system 8 separately. It means that required labor is not worse compared with an exhaust processing system which use one hose with a conventional arrangement, and handling of the system is not troublesome.

Since a large opening area can be provided for the exhaust system 8 in order to sufficiently ease the restriction imposed on the flow rate of the exhaust air, it is possible to efficiently prevent noises arising from the emission of exhaust from the pneumatic tool 1 and also prevent dust from being blown up. Any reason causing the output power of the pneumatic tool 1 can thus be eliminated. As the exhaust system 8 is unnecessary on the side of the pneumatic tool 1; moreover, the tools 1 can be made smaller and lighter to the extent that the exhaust system 8 is unnecessary.

The structure of the air hose used to connect the pneumatic tool 1 and the auxiliary tank 2*a* need not be a coaxial double structure but may be a structure in which two parallel pipelines (two air hoses), for example, are formed into one.

Furthermore, the exhaust system 8 need not be limited to which is provided for the auxiliary tank 2*a* but may be such that the exhaust system 8 is mounted in the air compressor 2*b* so as to exhaust air therefrom.

Figure 3:
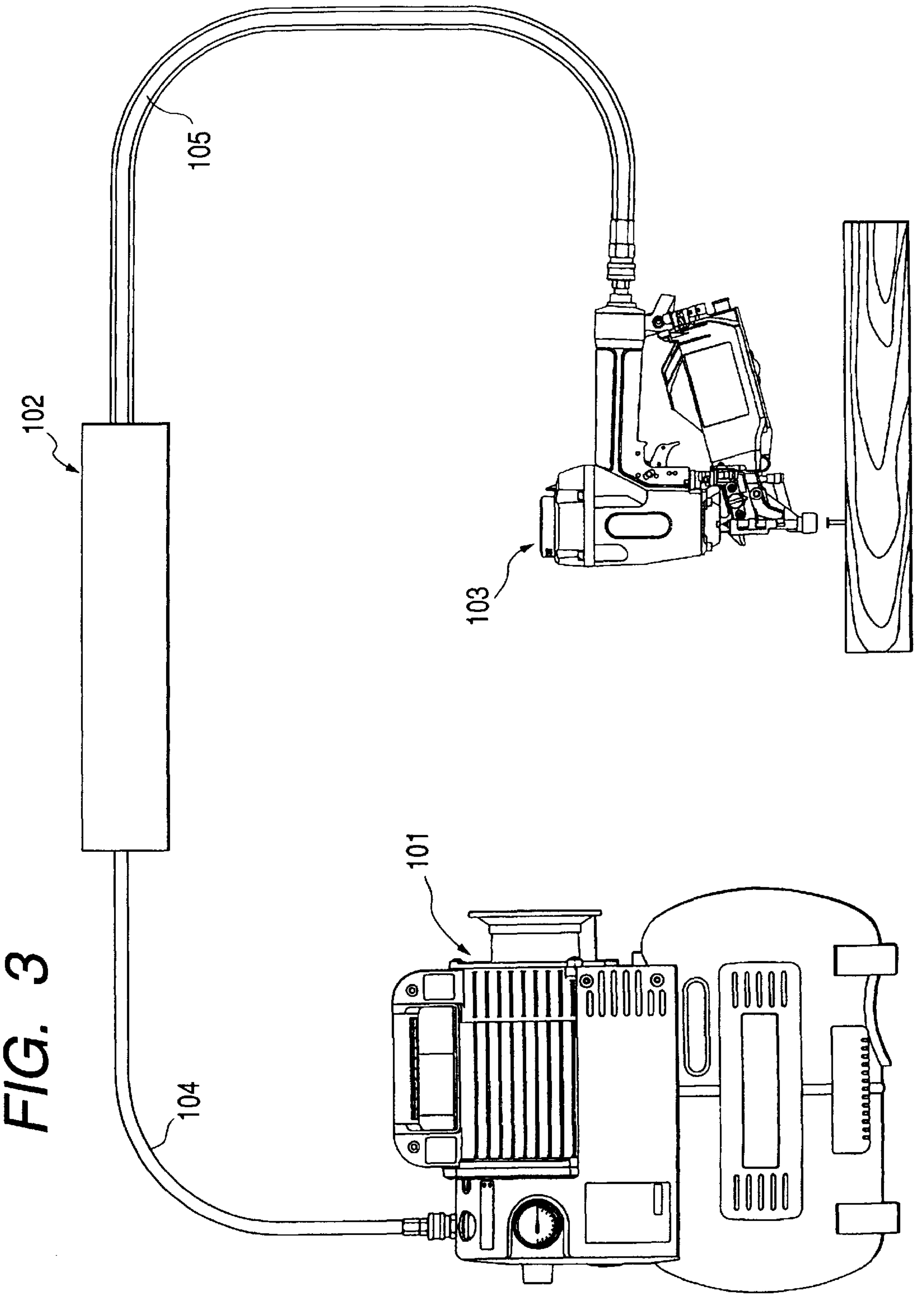
FIG. 3 is a block diagram of an air exhaust system for a pneumatic tool according to a second embodiment of the present invention.

A second embodiment of the present invention will now be described with reference to FIGS. 3 to 6. FIG. 3 is a block diagram of an air supply and exhaust system for a pneumatic tool, wherein reference numeral 101, 102 and 103 respectively denote an air compressor, a silencer and a pneumatic nailing machine. The air compressor 101 and the silencer 102 are connected by an air hose 104, and the silencer 102 and the pneumatic nailing machine 103 are connected by a coaxial air hose 105. The high-pressure air sent out by the air compressor 101 is supplied from the air hose 104 to the pneumatic nailing machine 103 through the relay passage of the silencer 102 and the center hose of the coaxial air hose 105, and exhaust air in the pneumatic nailing machine 103 is discharged into the atmosphere from the silencer 102 through the outer hose of the coaxial air hose 105.

Figure 4:
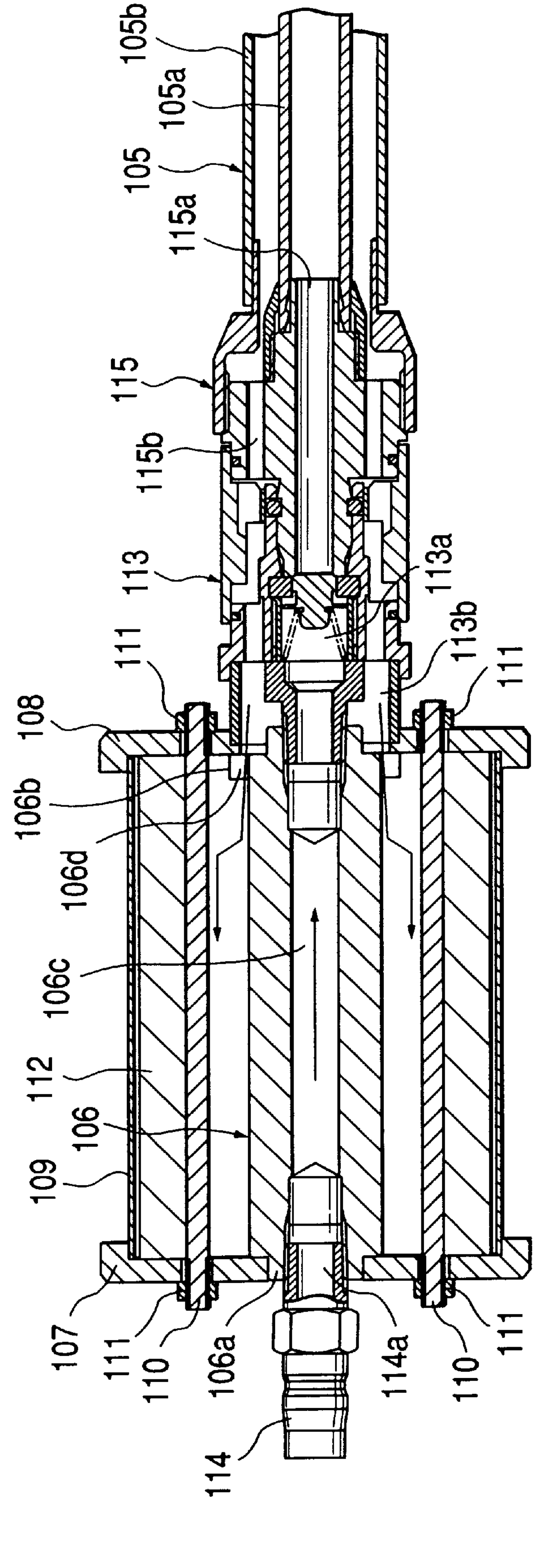
FIG. 4 is a sectional view of a silencer.

FIG. 4 shows the silencer 102. The silencer 102 includes an inner tube 106 as a straight pipe. In one end portion (on the left-hand side of the silencer 102 in FIG. 3) of an inner tube 106, a small-diameter portion 106*a* is formed. In the other end of thereof, a flange 106*b* is provided, and the flange 106*b* includes a vent hole. On the small-diameter portion 106*a* and the flange 106*b*, end plates 107 and 108 are respectively mounted. A cylindrical outer cover 109 surrounds the inner tube 106 and is held between the two end plates 107 and 108. In order to fix the cylindrical outer cover 109, stay bolts 110 pass through a plurality of holes provided in the two end plates 107 and 108 and are tightened with nuts 111 at both ends of each stay bolts 110. The outer cover 109 is provided with a number of exhaust holes (not shown) and a sound-absorbent material 112, such as felt and the like, is filled in between the outer cover 109 and the stay bolts 110.

A socket 113 (hereinafter called the coaxial socket) for the coaxial double pipe joint is screwed into one end portion of the flange 106*b* of the inner tube 106, whereas a plug 114 for an ordinary single pipe joint is screwed into the other end portion of the silencer 102. The center passage 113*a* of the coaxial socket 113 communicates with the center passage 114*a* of the plug 114 through the inner passage 106*c* of the inner tube 106, and the outer passage 113*b* of the coaxial socket 113 communicates with the atmosphere through the vent hole 106*d* of the flange 106*b* on the inner tube 106 and the exhaust hole of the outer cover 109.

The coaxial plug 115 of the coaxial air hose 105 is connected to the coaxial socket 113, and a coaxial socket at the other end of the coaxial air hose 105 is connected to the coaxial plug of the pneumatic nailing machine 103. Further, the socket (not shown) of the air hose 104 is connected to the plug 114, and a plug at the other end of the air hose 104 is connected to the socket of the air compressor.

Figure 5:
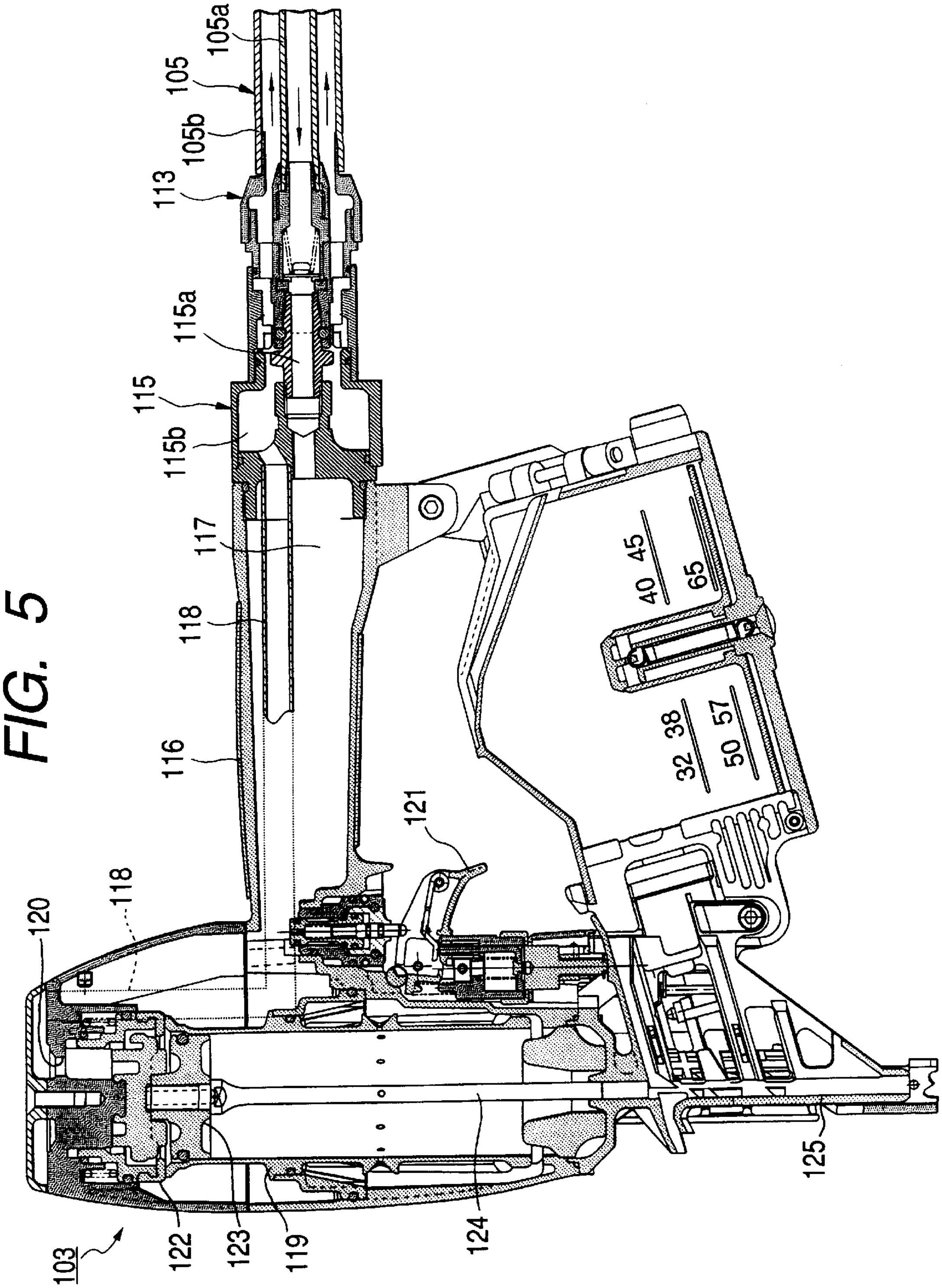
FIG. 5 is a sectional view of a pneumatic nailing machine.

FIG. 5 shows the pneumatic nailing machine 103. The coaxial plug 115 is fitted to the end portion of a grip portion 116. The center passage 115*a* of the coaxial plug 115 communicates with an air chamber 117 in the grip portion 116 and the outer passage 115*b* of the coaxial plug 115 communicates with an exhaust port 120 on a head side of a pneumatic cylinder 119 through an exhaust pipeline 118 passing through the grip portion 116. The pressurized air sent out by the air compressor 101 is supplied to the air chamber 117 through the air hose 104, the inner passage of the silencer 102 and the center hose 105*a* of the coaxial air hose 105.

As the construction and operating principle of the pneumatic nailing machine 103 are well known, the description thereof will be described briefly. When a trigger lever 121 is pulled, pilot pressure acting on the surface of the head valve 122 of the pneumatic cylinder 119 is discharged and the head valve 122 moves up from the descent position shown in FIG. 5, thus causing the pressurized air to flow into the air chamber on the head side of the pneumatic cylinder 119 from the air chamber 117. Consequently, a piston 123 and a driver 124 descends rapidly within the cylinder and the driver 124 strikes against a nail in a nose portion 125 and drives the nail into lumber and so on.

When the trigger lever 121 is released after the driving operation, the pilot pressure is applied onto the surface of the head valve 122. As the head valve 122 is descending by the pilot pressure, the communication of the air chamber 117 with the pneumatic cylinder 119 is cut off, which results in communicating a head-side exhaust port 120 with the exhaust pipeline 118. Accordingly, the pressurized air in the head-side air chamber is first passed through the outer hose 105*b* of the coaxial air hose 105 from the exhaust pipeline 118, then through the outer passage 113*b* of the coaxial socket 113 of the silencer 102 and subjected to sound reduction in the silencer chamber before being discharged into the atmosphere through the sound-absorbent material 112 and the outer cover 109.

Thus, the absolute volume of exhaust sound, particularly the exhaust sound that an operator can hear is significantly reduced because the exhaust air of the pneumatic tool 103 is discharged through the silencer 102 in a place away from an operator. Moreover, dust and the like on the floor are less scattered because the flow velocity of exhaust air flow is reduced even when the silencer 102 is placed on the floor, and dust and the like can be prevented from being scattered further if the silencer is placed in a place where dust and the like are less accumulated or in a position higher than the floor surface.

Figure 6:
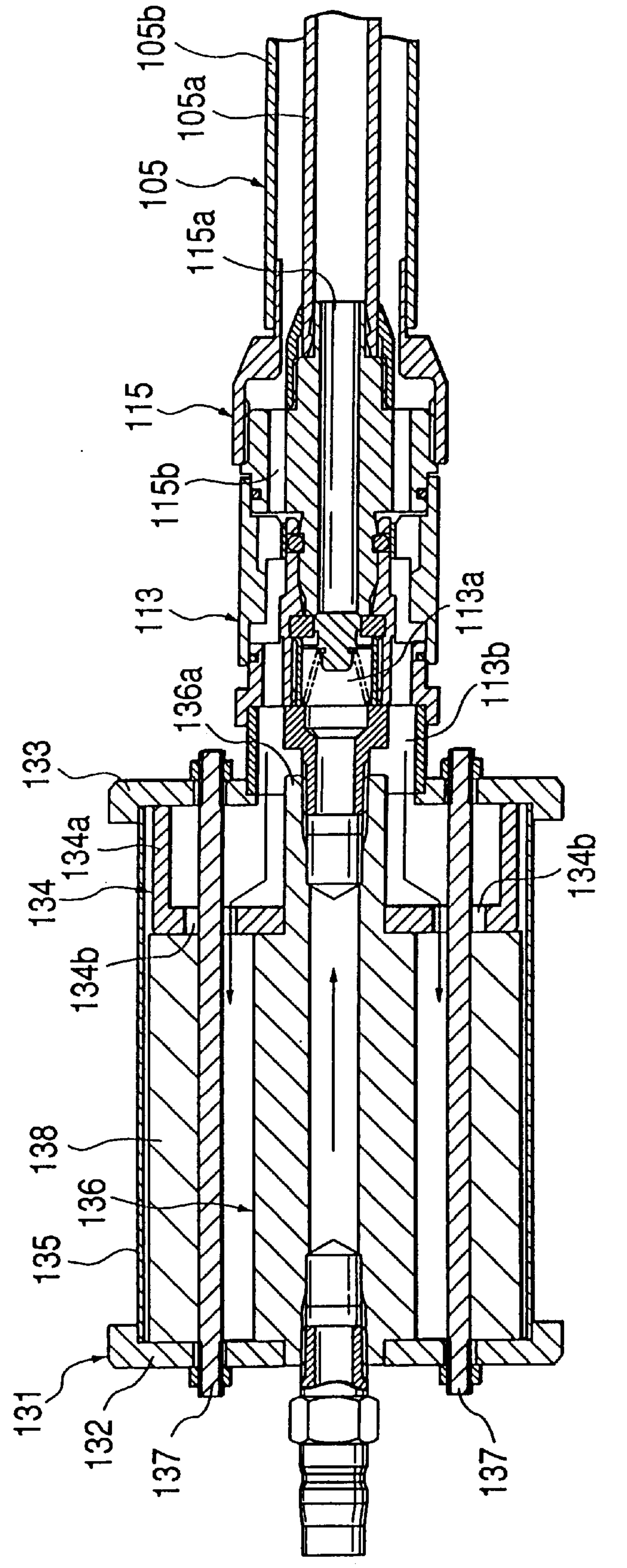
FIG. 6 is a sectional view of another embodiment of the silencer.

FIG. 6 shows another embodiment of the silencer according to the present invention, wherein a silencer 131 is arranged so that the interior of an outer cover 135 is divided into two chambers by inserting a cup-type baffle plate 134 between end plates 132 and 133. The baffle plate 134 is used to trap misty lubricating oil drops contained in the exhaust air of the pneumatic nailing machine, wherein the center hole of the baffle plate 134 is provided in a small-diameter portion 136*a* formed in an inner tube 136, and the edge face of a cup portion 134*a* is kept in contact with the inner side of the end plate 133 on the side of the coaxial socket 113 and fixedly held between the inner tube 136 and the end plate 133.

A plurality of vent holes 134*b* are formed in the baffle plate 134, and each stay bolt 137 for coupling the end plates 132 and 133 on both sides is passed through the vent hole 134*a*. The exhaust air flow that has flowed between the end plate 133 and the baffle plate 134 from the outer passage 113*b* of the coaxial socket 113 strikes against the baffle plate 134, so that the misty oil drops contained in the exhaust air flow adhere to the baffle plate 134. The air, which the most oil drops are deprived, is passed through a sound-absorbent material 138 from the vent hole 134*b* of the baffle plate 134 before being released into the atmosphere from the exhaust hole of the outer cover 135. Therefore, the oil drops are not scattered around and the surrounding areas are prevented from being contaminated with the effect of prolonging the life of the pneumatic tool as the sound-absorbent material 138 is less soiled and clogged with dust.

The present invention is not limited to the embodiment stated above but may be modified variously in the technical scope of the invention. Needless to say, such modifications are subject to this invention.

As set forth above, the exhaust sound is reduced. Particularly, the exhaust sound near the operator is extremely decreased since the exhaust air of the pneumatic tool in the air supply and exhaust system according to the present invention is guided through the coaxial air hose to the silencer positioned away from the operator before being discharged. Moreover, dust and the like on the floor are least scattered because the flow velocity of exhaust air flow is reduced by the silencer. Thus, any problem arising from noise and sanitation can be solved, whereby the present invention can contribute to improvement in working environment.

The present invention is based on Japanese Patent Application Nos. Hei. 10-115449 and Hei. 10-261368, which are incorporated herein by reference.

What is claimed is:

1. An air supply and exhaust system comprising:

a pneumatic tool;

an air supply source;

an exhaust apparatus including a filter through which exhaust from said pneumatic tool passes, said exhaust apparatus being fitted onto said air supply source and being provided apart from said pneumatic tool; and at least one double-pipeline air hose which includes two coaxial pipelines and connects said pneumatic tool to said air supply source, wherein one of said pipelines, supplies air to said pneumatic tool from said air supply source and the other pipeline exhausts air from said pneumatic tool to said exhaust apparatus.

2. The air supply and exhaust system according to claim 1, further comprising an auxiliary tank fitted between said pneumatic tool and said air supply source.

3. The air supply and exhaust system according to claim 2, wherein said exhaust apparatus is fitted on said auxiliary tank.

4. The air supply and exhaust system according to claim 3, further comprising:

a single-pipeline air hose which includes one pipeline and connects said air supply source to said auxiliary tank, wherein said double-pipeline air hose connects said pneumatic tool to said auxiliary tank.

5. The air supply and exhaust system according to claim 2, further comprising at least one coaxial pipe joint which includes two pipelines and connects said double-pipeline air have to one of said pneumatic tool and said auxiliary tank.

6. The air supply and exhaust system according to claim 1, further comprising at least one coaxial pipe joint which includes two pipelines and connects said double-pipeline air hose to one of said pneumatic tool and said air supply source.

7. An air supply and exhaust system comprising:

a pneumatic tool;

an air supply source;

a silencer fitted onto said air supply source, said silencer including a sound-absorbent chamber; and at least one double-pipeline air hose which includes two coaxial pipelines and connects said pneumatic tool to said air supply source, and said silencer, wherein one of said pipelines is for air supply from said air supply source to said pneumatic tool and the other of pipelines is for exhaust from said pneumatic tool to said silencer.

8. The air supply and exhaust system according to claim 7, wherein said sound-absorbent chamber includes a sound-absorbent material.

9. The air supply and exhaust system according to claim 8, wherein said sound-absorbent material is made of felt.

10. The air supply and exhaust system according to claim 7, further comprising at least one coaxial pipe joint which includes two pipelines and connects said double-pipeline air hose to one of said pneumatic tool, said air supply source, and said silencer.

11. The air supply and exhaust system according to claim 10, further comprising at least one single pipe joint which includes one pipeline and connects said double-pipeline air hose to one of said air supply source and said silencer.

12. The air supply and exhaust system according to claim 11, further comprising:

a single-pipeline air hose which includes one pipeline and connect said air supply source to said silencer, wherein said double-pipeline air hose connects said pneumatic tool to said silencer.

13. The air supply and exhaust system according to claim 12, further comprising at least one single pipe joint which includes one pipeline and connects said double-pipeline air hose to one of said air supply source and said silencer.

14. The air supply and exhaust system according to claim 7, further comprising a baffle plate against which exhaust flow hits in an exhaust passage from said pneumatic tool to said sound-absorbent chamber.

15. The air supply and exhaust system according to claim 14, further comprising at least one coaxial pipe joint which includes two pipelines and connects said double-pipeline air hose to one of said pneumatic tool, said air supply source, and said silencer.

16. The air supply and exhaust system according to claim 15, further comprising:

a single-pipeline air hose which includes one pipeline and connects said air supply source to said silencer, wherein said double-pipeline air hose connects said pneumatic tool to said silencer.

17. The air supply and exhaust system according to claim 16, further comprising at least one single pipe joint which includes one pipeline and connects said double-pipeline air hose to one of said air supply source and said silencer.

18. An air supply and exhaust system comprising:

a pneumatic tool;

an air supply source;

an auxiliary tank;

an exhaust apparatus including a filter through which exhaust from said pneumatic tool passes, said exhaust apparatus being fitted onto said auxiliary tank and being provided apart from said pneumatic tool; and at least one double-pipeline air hose including two coaxial pipelines for respectively supplying air from said air supply source to said pneumatic tool and for exhausting air from said pneumatic tool to said exhaust apparatus said at least one double-pipeline air hose connecting said pneumatic tool to said air supply source via said auxiliary tank.

19. The air supply and exhaust system according to claim 18, wherein said at least one double-pipeline air hose includes a single pipeline air hose portion connecting said air supply source with said auxiliary tank, and a double-pipeline air hose portion connecting said auxiliary tank to said pneumatic tool.

20. The air supply and exhaust system according to claim 18, further comprising a coaxial pipe joint for connecting said at least one double-pipeline air hose to one of said pneumatic tool and said auxiliary tank.

* * * * *